Nov. 16, 1954   J. W. RESIDE   2,694,582
COUPLING MECHANISM FOR CONNECTING
CYCLES IN PARALLEL RELATION

Filed May 16, 1951   2 Sheets-Sheet 1

INVENTOR
JAMES W. RESIDE

BY
Young & Wright
ATTORNEYS

Nov. 16, 1954
J. W. RESIDE
2,694,582
COUPLING MECHANISM FOR CONNECTING
CYCLES IN PARALLEL RELATION
Filed May 16, 1951
2 Sheets-Sheet 2
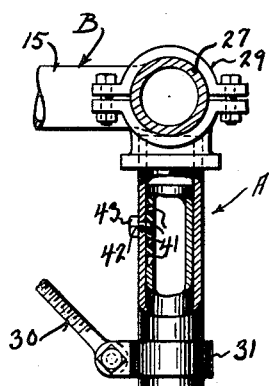
Fig. 3.
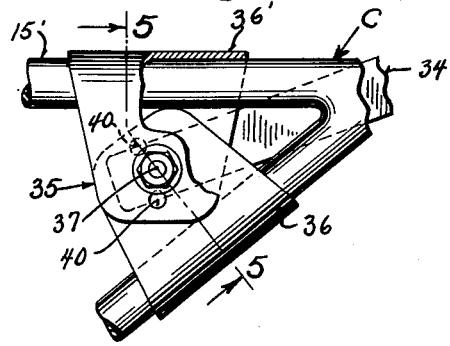
Fig. 4.
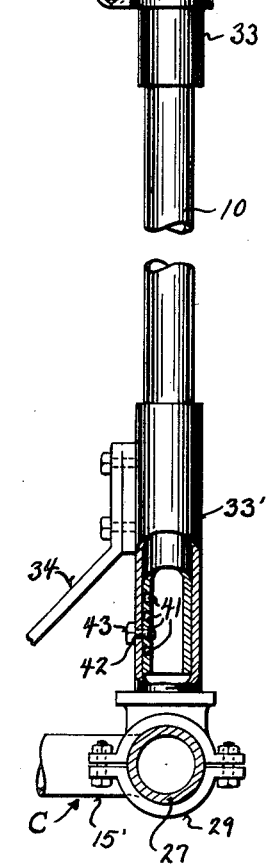
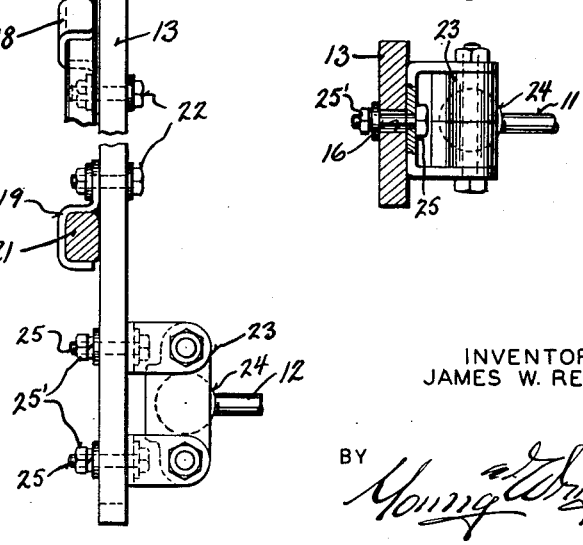
Fig. 6.
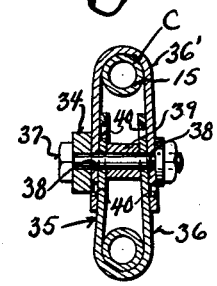
Fig. 5.
Fig. 7.
INVENTOR
JAMES W. RESIDE
BY
ATTORNEYS // 2,694,582
// Patented Nov. 16, 1954

2,694,582

COUPLING MECHANISM FOR CONNECTING CYCLES IN PARALLEL RELATION

James W. Reside, Racine, Wis.

Application May 16, 1951, Serial No. 226,703

1 Claim. (Cl. 280—209)

My invention relates to bicycles and motor bikes, and more particularly to a novel coupling for operatively connecting two cycles.

A primary object of my invention is to provide a cycle coupling including front and rear connecting bars whereby two bicycles, two motor bikes, or a bicycle and a motor bike may be connected, side by side, for use at a convenient distance apart and be held firmly in a vertical position.

A salient feature of my invention is to provide a coupling for cycles in which the cycle frames are so joined together, that in passing over irregularities of road surface, the cycles and coupling may travel at different levels and assume various angular positions relative one to the other.

Another important object of my invention is to provide an improved cycle coupling including adaptor plates and adjustable fastening elements which are adapted to be utilized with various sizes and makes of cycles, so as to attain a perfect alignment of any two cycles upon which the coupling is fastened.

Still another object of my invention is to provide the front and rear connecting bars of my coupling with longitudinal adjusting means, whereby the distance between the two cycles may be regulated as desired.

A further and more specific object of my invention is to provide a steering-gear attachment so that the steering wheels will have simultaneous and uniform movement.

A still further object of my invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

In the drawings:

Figure 3 is a fragmentary transverse section through the front columns of the cycle frames, taken on the line 3—3 of Figure 1, looking in the direction of the arrows, and showing in top plan the front connecting bar secured thereto.

Figure 4 is a fragmentary side elevational view taken on the line 4—4 of Figure 2, looking in the direction of the arrows, and illustrating in detail one form of a fastening element for the front connecting bar bracing arm.

Figure 5 is a section taken on the line 5—5 of Figure 4, looking in the direction of the arrows.

Figure 6 is a fragmentary vertical section taken on the line 6—6 of Figure 1, looking in the direction of the arrows, and illustrating details in the fastening elements for my rear connecting bars and adaptor plates.

Figure 7 is a detailed section taken on the line 7—7 of Figure 6, and showing my novel means for adjustably securing the rear connecting bars to an adaptor plate.

Figure 1:
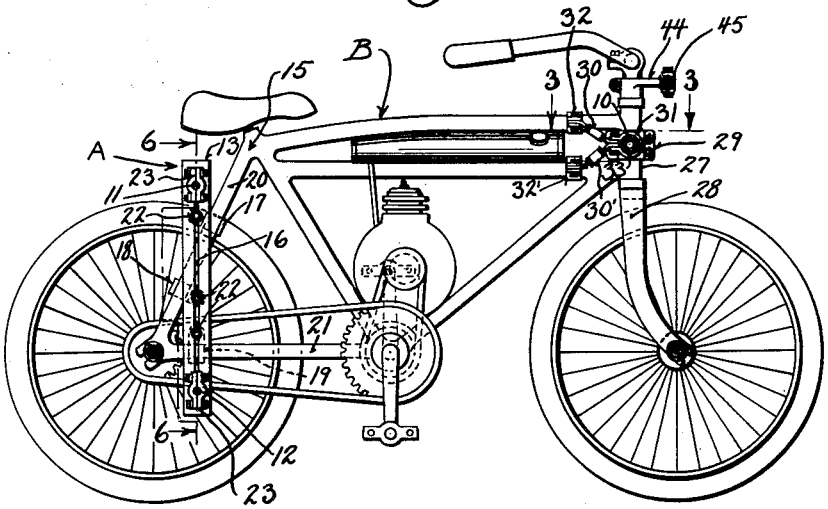
Figure 1 is a side elevation of a motor bike showing my novel coupling attached thereto, a section being taken through the coupling on the line 1—1 of Figure 2, and looking in the direction of the arrows.

Referring to the drawings in detail, wherein similar reference characters designate corresponding parts throughout the several views, the letter A generally indicates one preferred and practical embodiment of my invention, and shows my improved coupling secured to a motor bike B and a conventional bicycle C.

Figure 2:
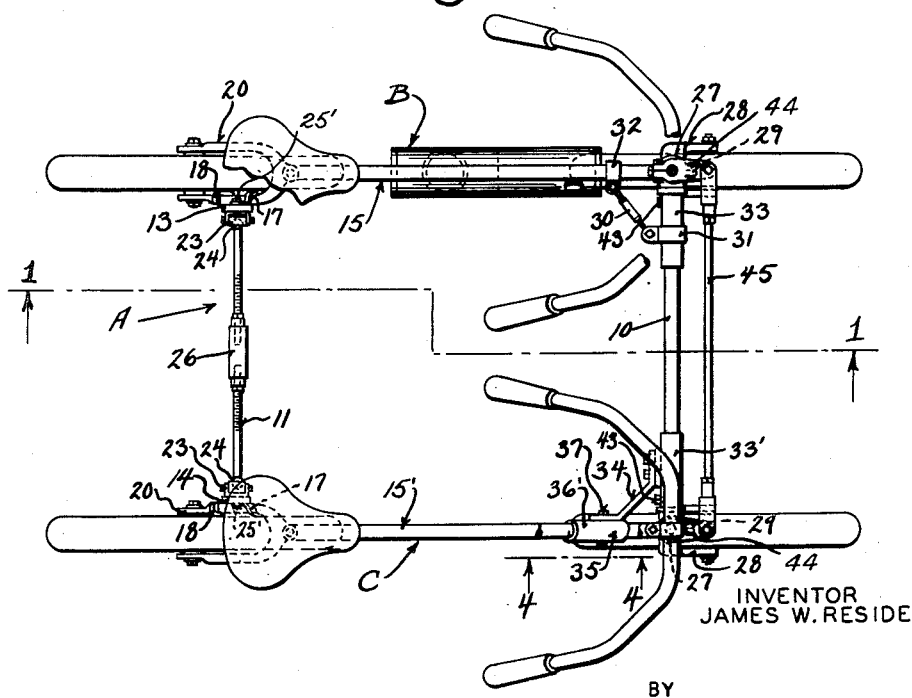
Figure 2 is a top plan view illustrating my novel coupling attached to a motor bike and bicycle, certain parts of the motor bike and bicycle being broken away to better illustrate the means for securing the front and rear connecting bars to the cycle frames.

Referring in particular to Figures 1 and 2 of the drawings, it can be seen that the cycle coupling A includes broadly, a front connecting bar 10 and upper and lower rear connecting bars 11 and 12, respectively. The rear connecting bars 11 and 12 are adjustably secured at each end to identically formed vertical adaptor plates 13 and 14. Adaptor plate 13 is secured to the rear portion of the motor bike frame 15, and adaptor plate 14 is similarly secured to the bicycle frame 15'. The adaptor plates 13 and 14 are each provided with an elongated centrally disposed vertical slot 16. The slots 16 serve as guides upon which the fastening elements (for securing the adaptor plates 13 and 14 to the frames 15 and 15' and for securing the rear connecting bars 11, 12 to the adaptor plates) are adjustably secured.

Inasmuch as the relationship of adaptor plate 13 to the motor bike frame 15 and rear connecting bars 11 and 12 is exactly the same as the relationship of the adaptor plate 14 to the bicycle frame 15' and rear connecting bars, only adaptor plate 13 and its related elements will be described in detail, it being understood that adaptor plate 14 and its related elements are exact duplicates.

Referring, therefore, in particular to Figure 6, it can be seen that adaptor plate 13 is secured to the motor bike frame 15 by the provision of three U-shaped clamps 17, 18 and 19, which are fastened to the frame tubes 20 and 21. U-shaped clamps 17 and 18 are fastened to the frame tube 20, and clamp 19 is likewise fastened to the tube 21. The clamps 17, 18 and 19 are adjustable to any position relative to the adaptor plate 13 merely by loosening the nuts on the bolts 22, pivoting, and then sliding the clamps lengthwise in the slot 16. Therefore, the plate 13 is adapted to be fastened to any type or make of cycle, regardless of the size of the angle formed by the frame tubes 20 and 21 by positioning the clamps as desired.

The upper and lower rear connecting bars 11 and 12 are also slidably secured to the adaptor plate 13 by providing each of the socket brackets 23, which receive the ball ends 24 of the rear connecting bars 11 and 12, with a pair of bolts 25 which in turn extend through the slot 16 and are locked to the plate by nuts 25'. As clearly shown in Figure 2 of the drawings, the rear connecting bars 11 and 12 are longitudinally adjustable by providing each with a centrally disposed turnbuckle arrangement 26.

From the description thus far, it should be apparent that the frames 15, 15' of the motor bike B and bicycle C are universally connected at their rear portions by providing ball and socket joints between the rear connecting bars 11, 12 and adaptor plates 13, 14. This arrangement allows the rear wheels to conform to and ride over irregular surfaces without strain upon the cycle frames or connecting members.

The front connecting bar 10 is secured to the steering columns 27 of each cycle just above the steering forks 28 by means of clamps 29. The front connecting bar 10 is adjustably braced at one end to the motor bike frame 15 by the provision of two pivotally mounted diverging turnbuckles 30, 30'. The proximal inner ends of the turnbuckles 30, 30' are mutually secured to a spring clip 31 which is clamped around one tubular end portion 33 of the front connecting bar 10. The spaced outer ends of the turnbuckles 30, 30' have pivotedly fastened thereto spring clips 32, 32' which are respectively adapted to be clamped to one of the horizontal frame tubes of the motor bike frame 15. The opposite tubular end portion 33' of the front connecting bar 10 is braced to the bicycle frame 15' by the provision of a single brace arm 34 which is bolted to the tubular end portion 33' of the connecting bar and pivotally fastened at its other end to a bicycle frame connecting member 35.

As illustrated in detail in Figures 4 and 5 of the drawings, this connecting member 35 comprises two identically formed U-shaped saddle plates 36 and 36' pivotally secured at their transverse centers adjacent the open ends thereof by means of a nut and bolt 37. The bolt 37 passes through a centrally bored spacing block 39 and through aligned apertures 38 formed in the sides of the saddle plates 36 and 36'. As stated above, the outer end of the brace arm 34 is pivotally secured to the connecting member 35 by the same bolt 37. It is readily apparent that by pivoting the saddle plates 36 and 36' to the desired position in relation to one another and to the brace arm 34, that the connecting member 35 may be secured to any type of cycle frame, whether it be Y-shaped as illustrated in Figure 4, or be provided with horizontal columns as illustrated in Figure 1. By providing additional apertures 40 on each of the saddle plates 36 and 36', the versatility of the connecting member 35 is further enhanced. It is to be noted that while I have described one means of bracing the front connecting bar 10 to the motor bike B (turnbuckles 30, 30') and another means for bracing the bar 10 to the bicycle C (connecting member 35), the two bracing means are interchangeable and may be substituted freely one for the other without departing from the spirit or scope of my invention, as it is obvious that the turnbuckles 30, 30' may be applied to the Y-shaped frame as well as to the horizontal tube type.

The front connecting bar 10 is also adjustable lengthwise, and this is accomplished by having its ends telescopically received in the tubular end portions 33 and 33' respectively. By referring to Figure 3, it can be seen that each end of the front connecting bar 10 is provided with a number of openings 41, any one of which may be aligned with an aperture 42 formed in each of the tubular end portions 33 and 33'. The front connecting bar 10 is then rigidly secured to the tubular ends by means of bolts 43 which are received in the apertures 41 and 42.

In order that the steering mechanisms of the motor bike and the bicycle may turn in unison, I provide each steering bar with a forwardly projecting lever 44, which levers are in turn joined by a tie rod 45.

From the above description, it is readily apparent that I have provided a new and improved cycle coupling which is adapted to be used on any type, make or size of cycle, regardless of the angles or spacings of the frame tubes. For example, the vertical adaptor plates 13 and 14 may be rigidly secured to any point to the cycle frames merely by properly spacing and pivoting the frame clamps 17, 18 and 19, and the rear connecting bars 11 and 12 may be spaced in any position relative to the adaptor plates by loosening the nuts 25' and sliding the bolts 25 in the slot 16. It is also apparent that the front connecting bar 10 may be attached to the frame column above the steering fork, and braced to any portion of the frame, whether the frame tubes are parallel or Y-shaped; and as both front and rear connecting bars are adjustable longitudinally, the cycles may be spaced at any desired distance.

From the foregoing, it is believed that the features and advantages of the invention will be readily apparent to those skilled in the art, and it will, of course, be understood that the changes in the form, proportions and minor details of construction may be resorted to without departing from the spirit of the invention or the scope of the appended claim, in which I claim:

A coupling for connecting two cycles side by side for joint operation comprising an extensible front connecting bar and a pair of rear extensible connecting bars, said front connecting bar including a pair of tubular members, each tubular member being provided with a clamp for securing one end to the front standard of a respective cycle, a central bar having its outer ends telescopically received in said tubular members and means for adjustably securing each of the outer ends of said bar to the respective tubular member, a pair of brace arms, each brace arm secured at one end to a respective tubular member, a pair of frame connecting members each secured to a respective cycle frame adjacent a respective tubular member, one of said frame connecting members including a pair of opposed U-shaped saddle plates pivotally secured at their transverse centers adjacent the open ends thereof, the other end of each brace arm being pivotally connected to a respective frame connecting member, a pair of vertical adaptor plates, each plate having an elongated longitudinal slot therein, a series of U-shaped frame clamps adjustably mounted in said slot, whereby each plate is adjustably clamped to the rear portions of a respective cycle frame regardless of the angle and disposition of the frame bars, said rear connecting bars being arranged in spaced vertical relation one to the other in rear of said front connecting bar, a pair of socket brackets adjustably mounted in each slot, and each end of each rear connecting bar being universally mounted to a respective socket bracket, whereby the said rear connecting bars are adjustably and universally mounted to said adaptor plates.

References Cited in the file of this patent

UNITED STATES PATENTS

| Number | Name | Date |
|---|---|---|
| 453,713 | Riess | June 9, 1891 |
| 618,769 | Barto | Jan. 31, 1899 |
| 750,480 | McLarty | Jan. 26, 1904 |
| 2,413,772 | Morehouse | Jan. 15, 1943 |

FOREIGN PATENTS

| Number | Country | Date |
|---|---|---|
| 534,296 | France | Mar. 23, 1922 |